Jan. 25, 1966     E. McCOWAN     3,231,690

PARALLEL-SERIES AUTOMOTIVE ELECTRICAL SWITCH

Filed July 8, 1963

INVENTOR
EDDIE McCOWAN

BY *Smith Michael & Gardiner*
ATTORNEYS

United States Patent Office 3,231,690
Patented Jan. 25, 1966

3,231,690
PARALLEL-SERIES AUTOMOTIVE
ELECTRICAL SWITCH
Eddie McCowan, Middleburg, Ky.
Filed July 8, 1963, Ser. No. 293,329
8 Claims. (Cl. 200—11)

This invention relates to an electric switch of a type particularly adapted for use in an automotive electrical system. Such a system conventionally employs a generator and a storage battery as current sources, and includes various electrical loads, including the automotive accessories, lights, ignition and the starting motor, all of which are energized from the same current sources. At standstill and during the extremely low speed of motor rotation involved in the starting operation, the generator does not contribute current to the source, the sole reliance being on the storage battery. During the starting operation it is desirable to maintain the ignition system voltage at a high level in order to assure an effective spark for the initiation of combustion in the cylinders. Despite the desirability of providing this high ignition voltage during the starting operation, the converse generally occurs due to the extremely heavy current drain placed on the battery by the starting motor in conventional electrical systems. This is particularly true where heavy motors are involved, such as in heavy construction equipment, trucks, etc.

To offset the reduced voltage caused by this heavy current drain, it has been proposed to provide a series parallel battery circuit whereby a booster battery is placed in series with the main battery during the starting operation in order to raise the battery voltage and thereby compensate for the voltage drop caused by the heavy current drain. For example, see L. M. Patterson, Jr., U.S. Patent No. 1,924,959, issued August 29, 1933. In systems of this type, an appropriate switch is provided to place the booster battery in parallel with all or a part of the main battery during periods other than starting in order to provide the proper voltage for the various circuit loads and to properly charge both the main and the booster batteries while running from the single generator. The switch of this invention is particularly adapted for use in such a series-parallel battery circuit.

Among the objects of this invention are:

(1) The provision of an electric switch particularly adapted for use in a series-parallel automotive electrical system, (2) The provision of an electric switch which will withstand the heavy current demands of a series-parallel automotive electrical system and which is of a simple and economical construction, (3) The provision of an electric switch in which the conductive elements can be fabricated from highly conductive metals, such as copper, without the necessity of the inclusion of other alloying components for structural strength, (4) The provision of an electric switch in which substantially planar conductive elements are mounted against a planar non-conductive block which imparts structural support to the conductive elements, (5) The provision of an electric switch in which elongated planar conductive elements have one end partially embedded in a supporting surface and have a free end extending upwardly from said surface to provide a resilient contacting portion at the free end, (6) The provision of an electric switch including a pivoted contact member normally biased to a predetermined position and including a biasing means which is adjustable to provide a variable biasing force to accommodate various structural installations, and (7) The provision of an electric switch including a pivoted contact assembly wherein tight electrical contact between the pivoted assembly and a stationary terminal assembly is assured through the provision of a bighting contact at the pivot point.

These objects, together with other objects and advantages inherent in the structure herein described, will become apparent from a consideration of the following specification and claims and a reference to the accompanying drawings forming a part thereof, and in which:

Figure 1:
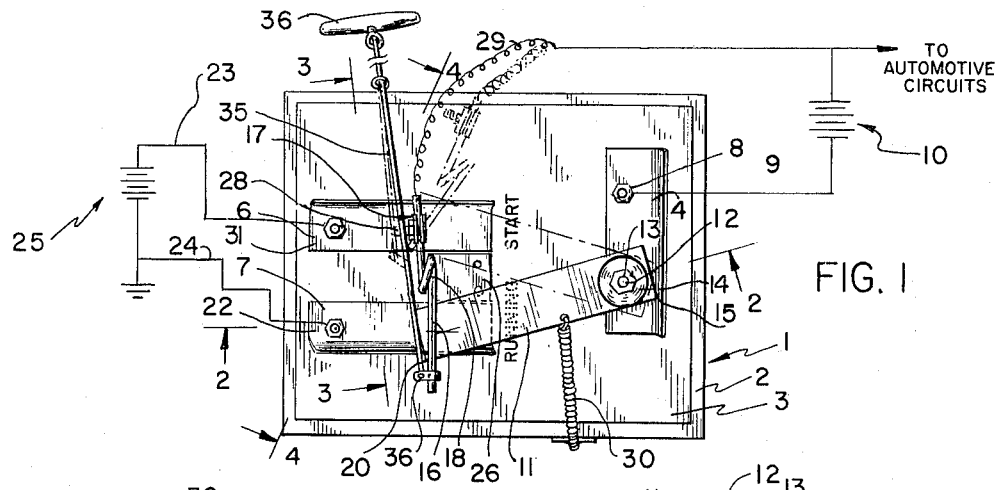
FIGURE 1 is a plan view of the series parallel switch of this invention together with a schematic representation of the circuit in which its use is intended.

Referring to the drawings in detail, it can be seen that the parallel-series automotive switch of this invention comprises a non-conductive base 1 constructed of an insulating material, such as wood or synthetic resin, of sufficient rigidity to provide substantial support for the switch elements. The base 1 is provided with a supporting surface 2 which preferably comprises a resilient insulating material 3, such as an elastic plastic, rubber, or fibrous material.

Figure 4:
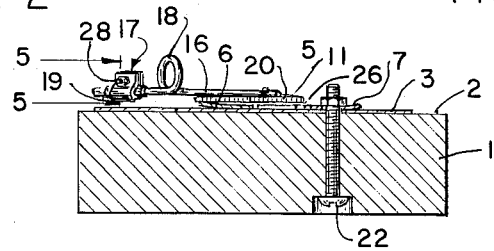
FIGURE 4 is a cross sectional view of the switch in its start position and taken along lines 4—4 of FIGURE 1.
Figure 5:
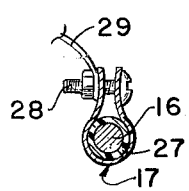
FIGURE 5 is a cross section of the positive main battery contact taken along lines 5—5 of FIGURE 4.

The conductive elements of the switch comprise a negative main battery terminal element 4, a substantially L-shaped pivoted contact assembly generally indicated at 5 (FIG. 4), a stationary positive auxiliary battery contact element 6 and a negative auxiliary battery contact element 7.

The negative main battery terminal element 4 includes a connecting element 8 to which is connected a conductor 9 leading to the negative pole of the main automotive battery 10. The connecting element 8 may be of any known construction and may extend through the terminal element 4 and into the base 1 to secure the terminal element to the base.

Figure 7:
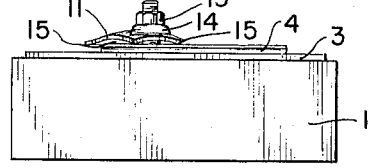
FIGURE 7 is a detail view of the pivotal connection of the conductive arm.

The L-shaped pivoted contact assembly 5 includes a planar conductive arm 11 which is arched throughout its midportion and is pivotally attached at one end to the negative main battery terminal element 4 by a fastener including an element such as a screw 12 secured to the base 1. The screw 12 extends from the base through the terminal element 4 and the arm 11 to provide a pivot point therefor and to constitute a stud for attachment of a retaining nut 13. A skirt or washer 14 may be included as a separate element or integral with the nut 13 in order to provide a broad base to bear against a point on the aforementioned arched portion of conductive arm 11 for the purpose of exerting a biasing force to urge the other (non-pivoted) end toward the plane of the supporting surface. This biasing force also serves to urge the edge of the pivoted end of the conductive arm 11 into tight engagement with the terminal element 4. The pivoted end of the conductive arm 11 is formed so as to include sharp angled corners 15 which are urged by said biasing force into bighting engagement with the terminal element 4. This action may be enhanced by imparting a slight upward bow to the cross sectional configuration of the edge of the pivoted end of the conductive arm 11 in order to direct the corners 15 downwardly toward the surface of the terminal element 4 (see FIG. 7). The aforedescribed combination of a conductive arm longitudinally arched and transversely bowed at its pivoted end with a fastening element constituting a pivot member and including a skirt bearing against a point on the arched surface of the conductive arm provides a structure wherein firm conductive contact is assured by bighting contact at the pivot end and by a strong biasing force applied through the arch to the other (contact) end.

The other (contact) end of the conductive arm 11 carries a laterally extending arm 16 including an intermediate portion and carrying at its free end a positive main battery contact element 17. In the particular embodiment of the invention illustrated in the accompanying drawings, the intermediate portion of the laterally extending arm 16 comprises a single convolute loop 18. This loop is resilient and functions as a torsion spring to bias the ends of the laterally extending arm downwardly thereby canting the contact portion of the conductive arm 11 and the positive main battery contact element 17 outwardly from said intermediate portion of the laterally extending arm. The canting of these elements causes their respective outermost edges 20 and 19 to be directed downwardly into tight engagement with the auxiliary battery contact elements 6 and 7 whereby the edges 19 and 20 tend to scrape the surfaces of the auxiliary battery contact elements 6 and 7 during movement of the pivoted contact assembly. This scraping action assures that the contact area of the elements 6 and 7 will be maintained free of any accumulation of foreign matter which would interfere with the requisite conductive contact between the stationary contacts 6 and 7 and the movable contacts 11 and 17. This becomes a matter of particular importance where the switch of this invention is located in the engine compartment of a motor vehicle in order to minimize the length of battery leads required. Thus located, the switch is subjected to an atmosphere including gas and oil vapors which tend to condense and accumulate on exposed parts and then to collect other foreign matter being circulated in the compartment by the engine cooling system fan. In such an environment, the rubbing contact of conventional knife switch elements may not be sufficient to remove such foreign matter accumulations, particularly after a switch has remained in one position for a long period of vehicle operating time during which a substantial buildup of dirt is permitted to occur. This scraping action is further enhanced by an action of the auxiliary battery contact elements 6 and 7 now to be described.

Each said auxiliary battery contact element 6 and 7 comprises an elongated planar conductive element having a fixed terminal end secured to the supporting surface 2 by conventional fastening elements 21 and 22, and having free contact ends extending above the supporting surface 2 and underlying the path of the aforesaid movable contacts 11 and 17. The fastening elements 21 and 22 serve as terminals for attachment of positive and negative auxiliary battery leads 23 and 24 respectively, which leads in turn are connected to the appropriate terminals of an auxiliary starting battery 25. Where a resilient supporting surface 3 is used, the fastening elements 21 and 22 serve to draw the fixed terminal ends of contact elements 6 and 7 into the resilient supporting surface 3 where the said ends remain partially embedded in the supporting surface 3. The resiliency of the surface tends to bias the contact ends of the elements 6 and 7, which remain free of any attachment, upwardly toward the path of travel of the movable contacts 11 and 17 in a direction opposite to that of the previously described biasing force applied to the conducting arm 11 through the arched portion thereof, thereby increasing the contact pressure between said stationary contact elements 6 and 7 and said movable contact elements 11 and 17. Additionally, the fact that elements 6 and 7 are partially embedded in the resilient supporting surface 3 resists rotational movement of the elements 6 and 7 about their single point of attachment and thereby maintains the free (contact) ends of said elements in proper position underlying the path of travel of the movable contacts 11 and 17.

By thus imparting biasing force to the respective planar switch elements 6, 7 and 11, which are supported on and operate in close proximity to the planar supporting surface 2 of the base 1, the elements themselves can be constructed of inexpensive but highly conductive commercial grade copper, without the necessity of expensive alloying ingredients generally present in components of previously known switch structures to provide the needed strength and resiliency.

Figure 2:
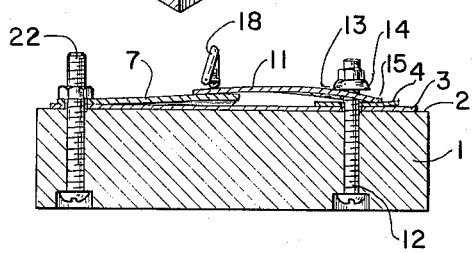
FIGURE 2 is a cross sectional view taken along lines 2—2 of FIGURE 1.
Figure 3:
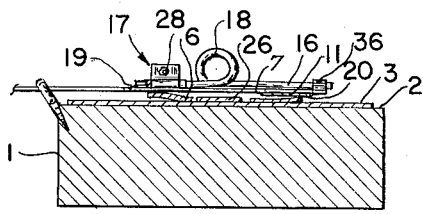
FIGURE 3 is a cross sectional view of the switch in its running position and taken along lines 3—3 of FIGURE 1.

Each auxiliary battery contact element 6 and 7 has a portion intermediate the fixed terminal end and the free contact end, which intermediate portion may have a slight twist imparted thereto so as to slant the contact surfaces of the free ends of the respective stationary elements toward each other in a direction opposite to that of the aforedescribed cant of the movable contact elements 11 and 17. This configuration is evident in FIGS. 2–4 and serves to enhance the aforementioned scraping contact between elements 6 and 7 and elements 11 and 17 by further increasing the angle of intersection of the contact surfaces of the former with the outermost edges 19 and 20 of the latter. Furthermore, such slanting of the free contact ends of elements 6 and 7 brings the innermost edges of said ends close to the supporting surface thereby assuring that the movable contact element 11 will ride over the edges onto the contacting surface without any impediment to the free movement thereof, while the outermost edge portions of the free ends of elements 6 and 7 remain spaced substantially from the supporting surface to maintain freedom of movement and assure maintenance of the aforesaid tight conductive relationship with its coacting contact element 11 or 17. To further assure freedom of any impediment to the movable contact element 11 freely riding over the inner edges of the free contact ends of elements 6 and 7, there may be provided an electrically neutral guide element 26 between and spaced from the elements 6 and 7 and of substantially the same thickness as elements 6 and 7. This guide element 26 is positioned underlying the path of travel of the contact element 11 and serves to maintain said element 11 in a path spaced from the supporting surface sufficiently to assure freedom from interference of free movement which might otherwise occur by interengagement of the outermost (scraping) edge 19 of the contact element 11 with the innermost edge of the contact element 7.

A non-conductive sleeve 27 surrounds the free end of the laterally extending arm 16 and carries the contact 17 insulated therefrom. Contact element 17 comprises a strap of conductive material surrounding said non-conductive sleeve 27 including upstanding extremities fastened together by a conventional fastening element 28 serves to bind said strap tightly around said sleeve 27 and retain the entire assembly on the arm 16. In addition, the fastening element 28 serves as a terminal to which is attached a flexible lead 29 which lead establishes an electrical path to the positive terminal of the main automotive battery 10 and to the conventional automotive load circuits (not shown).

The pivoted contact assembly is normally maintained in a position such that the conducting arm 11 of the pivoted contact assembly is in contact with the negative auxiliary battery contact element 7 and the positive main battery contact element 17 is in contact with the positive auxiliary battery contact element 6, thereby establishing a parallel relationship between main battery 10 and auxiliary battery 25. In order to maintain the pivoted contact assembly in the aforesaid normal (or running) position, an elongated elastic biasing element 30 is provided. The biasing element 30 extends from an intermediate position on the conductive arm 11 in a direction substantially normal to the arm to a point of attachment to an anchoring element 31. The anchoring element is pivotally attached to the base 1 in a suitable manner such as by a screw 32, whereby pivotal movement of the anchoring element 31 about said pivotal attachment 32 will vary the location of the point of attachment of the biasing element 30 with respect to the base in a direction substantially parallel to the axis of the conductive arm 11. Thus, such movement varies the angle of the elastic element 30 with respect to the conductive arm 11 and thereby provides a fine adjustment of the biasing force applied to said arm 11 by the elastic element 30.

Figure 6:
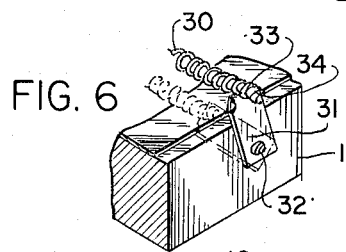
FIGURE 6 is a detail view of the anchoring element for the resilient biasing means of the switch.

A more pronounced (course) adjustment of this biasing force is accomplished by varying the effective length of the elastic element 31. To provide for this course adjustment, the elastic element 30 is formed of a coil spring comprising a plurality of convolutions of a tight configuration, i.e., each convolution bearing on the next adjacent convolution. Additionally, the anchoring element 31 which is preferably formed of sheet material, has its upper edge 33 formed into a substantially arcuate configuration as by bending the corner portions 34 outwardly as seen in FIG. 6. Thus formed, the upper portion of the anchoring element 31 provides a seat for retention of the biasing element 30, the outwardly turned corners 34 serving to prevent the biasing element from sliding sidewardly off the anchoring element. In adjusting the biasing force, the biasing element 30 is stretched to provide the desired force, brought into position over the arcuate edge 33 of the anchoring element 31, and pushed downwardly over the edge 33 so that the tight adjacent convolutions engage the opposite faces of the anchoring element 31, thereby retaining the biasing element in its adjusted, operative position.

The provision of a course and a fine adjustment of the biasing force is an important feature of the switch, as is apparent when it is considered that the switch is preferably located between the storage batteries and the starting motor in order to minimize the length of the conductors associated therewith. Thus, in certain vehicles such as cab-over-engine types, this location may be readily available to the operator. In this case an operating knob (not shown) may be attached directly to the convolute loop 18 of the laterally extending arm 16, whereby the operator may grasp the knob to directly actuate the switch during starting. Inasmuch as no actuating linkage is involved, the biasing force necessary to return the switch to the normal (run) position upon release by the operator is only that force necessary to overcome the frictional drag of the L-shaped pivot contact assembly 5. If, however, the installation involves a vehicle wherein the appropriate location of the switch is more remote from the operator's position, it will be necessary to provide a remote actuator, such as a conventional system of levers and linkages (not shown), a Bowden-wire cable, or (as illustrated) a flexible actuating cable 35 terminating in an actuating handle 36 located in the operator's cab at an appropriate point in close proximity to the vehicle operator. The actuator may be connected to the pivoted contact assembly 5 by any conventional means, such as the clamp 36 of FIGS. 1 and 3. As shown, the cable comprises a non-conductive material. In the event that an actuator of conductive material is provided, it would be necessary to insulate the clamp 36 from the pivoted assembly 5 to avoid short circuiting of the auxiliary battery while the switch is in the start position. The frictional drag that must be overcome by the aforementioned biasing element 30 will, in the case of the remote installation, be much greater than in the case of direct manual actuation. Further, the frictional drag will depend upon the length of the actuator, the type of actuator used, and may vary over a period of time due to wear, lack of lubrication of actuator elements, etc. Thus, the adjustment provided by the anchoring element 31 permits the biasing force to be adapted to a particular installation and variety of service conditions.

In operation, the vehicle operator will, prior to starting the vehicle, move the pivoted contact assembly to the "start" position. In this position, the normal ground circuit from the main battery 10 to the vehicle chassis will be broken, and the auxiliary battery 25 inserted in series with the ground circuit to provide a high starting voltage, i.e., the total of the two battery voltages. With the batteries so connected, the conventional vehicle starting circuit is energized to provide high starting motor torque and effective spark under the prevailing high voltage conditions. After initiation of combustion, the operator may release the switch actuator, at which time the biasing element 30 will serve to return the switch to the run position wherein the auxiliary battery 25 and the main automotive battery 10 will be returned to a normal (parallel) circuit connection.

While the switch has been described as used with a negative ground automotive electrical system, it will be obvious that it may be used with positive ground systems by merely reversing both battery connections. Similarly, the choice of battery voltages is optional. Thus, a pair of batteries of equal voltage are preferably used, but an auxiliary battery of somewhat lesser voltage than that of the main battery may be used. In the latter regard, it is contemplated that an old battery which is not dependable for main battery service, may be utilized as an auxiliary battery by "shorting out" a dead cell and utilizing the lesser voltage of the remaining serviceable cells. In such case, it may be advisable to eliminate the auxiliary battery from the run circuit by eliminating the positive main battery lead 29, thus avoiding "pull down" of the main battery 10 by the auxiliary battery 25 during normal operation or standstill. When so used, reliance would necessarily be placed on an external charging source to maintain the auxiliary battery in a charged condition.

From the foregoing description of this invention it is apparent that I have provided a simple, inexpensive electrical switch particularly adapted for effective use in a series-parallel automotive starting circuit. While the invention has been described in connection with one particular embodiment thereof, it is so described for illustrative purposes only. Since numerous modifications and changes will readily occur to those skilled in the art, it is obvious that the invention is not limited to the exact construction and operation shown and described, but includes all suitable modifications and equivalents as fall within the scope of the invention as recited in the following claims.

I claim:

1. A parallel-series automotive starting switch comprising a non-conductive base including a substantially planar supporting surface, stationary planar conductive switch elements supported on said surface and disposed substantially within a plane adjacent to said supporting surface, said elements comprising parallel spaced elongated positive and negative auxiliary battery contacts, each said elongated contact element having a fixed terminal end secured to said surface by a fastening element and having a relatively free contact end extending slightly above said plane adjacent to said supporting surface, said stationary elements further comprising a negative main battery terminal element spaced from said free contact ends, a pivot element extending perpendicularly from said negative main battery terminal element at a point substantially equidistant from said free contact ends, and a substantially L-shaped pivoted contact assembly including a planar conductive arm pivoted at one end to said pivot element of said negative main battery terminal element and provided near its other end with a laterally extending arm disposed substantially within an arcuate path overlying said free contact ends and including a free end, a positive main battery contact element mounted on said free end and insulated from said conductive arm, the spacing of said last-named element from said conductive arm being equal to the aforesaid spacing of said spaced positive and negative auxiliary battery contacts, means biasing said pivoted contact assembly to normally maintain said switch in a run position wherein said conductive arm is in contact with said free contact end of said negative auxiliary battery contact and wherein said positive contact is in contact with said free contact end of said positive auxiliary battery contact, and actuating means connected to said pivoted contact assembly to move said pivoted contact assembly to a start position wherein said conductive arm is in contact with said free contact end of said positive auxiliary battery contact and wherein said positive main battery contact element is free of contact with other switch elements.

2. The parallel-series automotive starting switch of claim 1 wherein the midportion of said planar auxiliary battery contact elements are twisted to cant said free ends toward each other to facilitate engagement by said conductive arm.

3. The parallel-series automotive switch of claim 1 wherein said supporting surface of said non-conductive base includes resilient portions underlying at least said fixed terminal ends of said auxiliary battery contact elements, said fastening elements serving to draw said fixed terminal ends into said resilient surface to partially embed said ends in said surface, the resiliency of said surface exerting a biasing force on said free ends of said contacts, thereby aiding in the maintenance of tight contact between said free ends and said pivoted contact assembly.

4. The parallel-series automotive starting switch of claim 1 wherein said laterally extending arm includes a portion intermediate to said free end and said conductive arm, said portion comprising a resilient convolute loop in said arm, said loop imparting resiliency to said arm to bias said other end of said pivoted arm and said positive main battery contact toward said auxiliary battery contacts, thereby aiding in the maintenance of tight contact of said arm and said main battery contact with said auxiliary battery contacts.

5. The parallel-series automotive starting switch of claim 1 wherein said pivoted conductive arm includes an arched portion and wherein said pivot element includes a portion bearing on a point of said arched portion to bias said other end of said pivoted arm toward the plane of said auxiliary battery contacts.

6. The parallel-series automotive starting switch of claim 5 wherein the pivoted end portion of said conductive arm is bowed upwardly in cross section and the juncture of the peripheral side and end edges of said portions comprise sharply defined angles directed downwardly by said bowed cross section and maintained in tight bighting contact with said terminal element by said biasing force exerted by said fastening element on said arched portion.

7. The parallel-series automotive starting switch of claim 1 wherein said means to normally maintain said pivoted contact assembly in a run position comprises an elongated elastic biasing element attached to said conductive arm and extending in a direction approximately normal thereto to a point of attachment with one end of an anchoring element, said anchoring element being pivotally attached at its other end to said base whereby pivotal movement of said anchoring element varies the position of the point of attachment of said biasing element in a direction substantially parallel to the axis of said conductive arm, thereby providing a fine adjustment of the biasing force applied to said arm.

8. The parallel-series automotive starting switch of claim 7 wherein said elastic element comprises a convolute spring and said one end of said anchoring element comprises a substantially arcuate end portion, one convolution of said spring element passing over said one end of said anchoring element whereby the adjacent edges of said convolution engage opposite sides of said arcuate end portion to retain said spring in attachment with said anchoring element.

References Cited by the Examiner
UNITED STATES PATENTS

| | | |
|---|---|---|
| 843,186 | 2/1907 | Turner et al. |
| 1,526,989 | 2/1925 | Kemp _____ 200—161 X |
| 1,625,565 | 4/1927 | Rosenberg et al. ___ 200—161 X |
| 1,924,959 | 8/1933 | Patterson. |
| 1,992,674 | 2/1935 | Neubeck _____ 200—11 |
| 2,786,921 | 3/1957 | List _____ 200—161 |

KATHLEEN H. CLAFFY, *Primary Examiner.*

BERNARD A. GILHEANY, *Examiner.*